(12) United States Patent
Hoffmann et al.

(10) Patent No.: US 9,140,458 B2
(45) Date of Patent: Sep. 22, 2015

(54) COOKTOP-INTERFACE HAVING PROJECTION DISPLAY DEVICE

(75) Inventors: Harald Hoffmann, Rothenburg o.d. Tauber (DE); Armin Pojda, Gebsattel (DE); Stefan Edenharter, Nuremberg (DE)

(73) Assignee: ELECTROLUX HOME PRODUCTS CORPORATION N.V., Brussels (BE)

( * ) Notice: Subject to any disclaimer, the term of this patent is extended or adjusted under 35 U.S.C. 154(b) by 138 days.

(21) Appl. No.: 13/639,882

(22) PCT Filed: Apr. 21, 2011

(86) PCT No.: PCT/EP2011/002037
§ 371 (c)(1),
(2), (4) Date: Oct. 8, 2012

(87) PCT Pub. No.: WO2011/137982
PCT Pub. Date: Nov. 10, 2011

(65) Prior Publication Data
US 2013/0038840 A1   Feb. 14, 2013

(30) Foreign Application Priority Data
May 5, 2010  (EP) .................................. 10004732

(51) Int. Cl.
*G03B 21/20* (2006.01)
*F24C 3/12* (2006.01)
*F24C 7/08* (2006.01)

(52) U.S. Cl.
CPC ................. *F24C 7/082* (2013.01); *F24C 3/124* (2013.01); *F24C 7/086* (2013.01); *G03B 21/2006* (2013.01)

(58) Field of Classification Search
CPC ...... G03B 21/00; G03B 21/134; G03B 21/14; G03B 21/20; G03B 21/2006; H04N 9/31; H04N 9/3138; H04N 9/315; F24C 3/124; F24C 7/08; F24C 7/082–7/083; F24C 7/085–7/086; F24C 15/105–15/106
USPC ..................... 353/13–14, 22, 28–29, 39, 119, 353/121–122; 362/23.01, 23.07–23.12; 340/815.4, 815.45; 126/1 R, 37 R, 37 A, 126/39 BA, 213, 217–218
See application file for complete search history.

(56) References Cited

U.S. PATENT DOCUMENTS 5,059,960 A * 10/1991 Rosenberg et al. ........... 345/174
5,506,767 A *  4/1996 Naylor ............................ 700/11
(Continued)

FOREIGN PATENT DOCUMENTS

| DE | 19646826 | 8/1997 |
|---|---|---|
| DE | 10133135 | 1/2003 |
| DE | 10302514 | 9/2004 |
| DE | 102008027220 | 12/2009 |
| EP | 1273851 | 1/2003 |
| EP | 1724088 | 11/2006 |
| EP | 1731841 | 12/2006 |
| EP | 1903284 | 3/2008 |
| EP | 2107855 | 10/2009 |
| EP | 2141415 | 1/2010 |
| JP | 2007165605 | 6/2007 |

OTHER PUBLICATIONS

International Search Report PCT/EP2011/002037, dated Aug. 9, 2011, 3 pages.

*Primary Examiner* — Toan Ton
*Assistant Examiner* — Jori S Reilly-Daikun
(74) *Attorney, Agent, or Firm* — Pearne & Gordon LLP

(57) ABSTRACT

A cooktop-interface includes at least one display device, a display sign layer with at least one display sign provided in connection with the display device and back illumination lighting for projecting the display sign to the lower side of a cooktop-panel arranged upstream the back illumination lighting and the display sign layer.

21 Claims, 2 Drawing Sheets

(56) References Cited

U.S. PATENT DOCUMENTS

Figure 1:
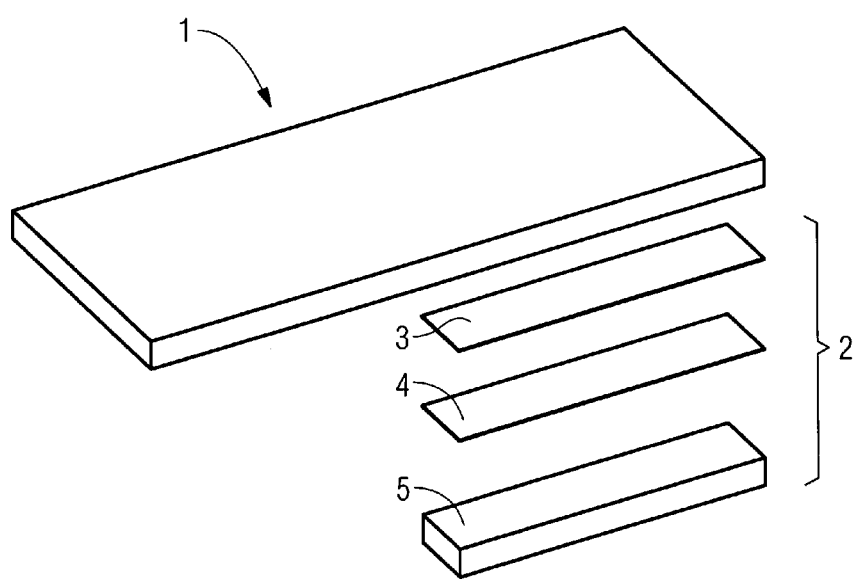

| | | | |
|---|---|---|---|
| 8,223,131 B2 * | 7/2012 | Rudolph et al. | 345/173 |
| 8,314,370 B2 * | 11/2012 | Tominaga et al. | 219/445.1 |
| 8,338,757 B2 * | 12/2012 | Isoda et al. | 219/450.1 |
| 8,578,293 B2 * | 11/2013 | Breunig et al. | 715/812 |
| 8,604,397 B2 * | 12/2013 | Isoda et al. | 219/625 |
| 8,606,180 B2 * | 12/2013 | Santinato et al. | 455/41.2 |
| 8,674,270 B2 * | 3/2014 | Anderson et al. | 219/448.12 |
| 2005/0073823 A1 | 4/2005 | Engelmann et al. | |
| 2010/0147823 A1 * | 6/2010 | Anderson et al. | 219/391 |
| 2011/0062143 A1 * | 3/2011 | Satanek | 219/489 |
| 2013/0056457 A1 * | 3/2013 | Lee et al. | 219/620 |
| 2013/0249847 A1 * | 9/2013 | Goss et al. | 345/173 |
| 2013/0268098 A1 * | 10/2013 | Goss et al. | 700/83 |

\* cited by examiner

COOKTOP-INTERFACE HAVING PROJECTION DISPLAY DEVICE

The present application is directed to a cooktop-interface, a cooktop-panel, a cooking device and a method of operating a cooktop-interface.

A cooktop-interface is known for example from EP 1 273 851 A2. The known cooktop-interface comprises a touch sensitive strip adapted to change a parameter and further comprises an LED based display bar adapted to indicate the respective parameter value. The display bar is partitioned into several segments. The border of each segment is visualized by a rectangular line. The touch sensitive strip is visualized by tapered lines indicating the direction of increasing or decreasing respective parameters.

EP 2 141 415 A2 shows a cooktop-interface which can be arranged at a lower side of a cooktop-panel. The cooktop-interface comprises a casing with a plurality of apertures each adapted to guide through light emitted by an LED. LEDs arranged on a printed circuit board are positioned at the lower side of the casing. The casing, i.e. the apertures, are covered by a display mask comprising letter-figures or other symbols. The mask is arranged on a side of the casing averted from the printed circuit board.

It is an object of the invention to provide an alternative to the known cooktop-interfaces. In particular, a cooktop-interface shall be provided that can be easily integrated with cooking-panels and which in particular allows to visualize clearly laid out information if required. Further, a cooktop-panel, a cooking device and a method of visualizing information on a cooktop-panel shall be provided.

This object is achieved by independent claims 1, 11, 12 and 13. Embodiments of the invention result from the dependent claims.

According to independent claim 1, a cooktop-interface is provided which comprises at least one display interface, a display sign layer comprising at least one display sign provided in connection with or related to the display device and at least one back illumination lighting for projecting the at least one display sign to or on a lower side of a cooktop-panel arranged upstream the back illumination lighting and display sign layer.

The display device may be a liquid crystal display adapted to display information about at least one operational parameter of the cooktop-panel or related cooking device. Such a parameter may be a temperature of a cooktop hub region of the cooktop-panel, a switching stage of a heating element arranged in or below a certain cooktop hub region, for example. A cooktop hub region may be a section of a cooktop-panel adapted to position thereon a cooking utensil, such as a pot or a roasting or frying pan for example, for the purpose of heating it.

The display sign layer may be adapted to allow visualization of additional information related to at least one of the parameters displayed by the display device. As an example a tapered line display sign may be provided in concert with a display site of the display device, which tapered line indicates the direction of increasing and decreasing parameter values. If the actual value of a parameter is visually represented by a bar for example, the relative position between maximal and minimal parameter values can be readily indicated. Other types of display signs may be contemplated, in particular display signs that are characteristic for a parameter to be indicated by the display device. In particular, additional information specific to the parameter indicated or to be indicated by the display device may be selectively provided by adequately powering the back illumination lighting to make respective display signs visible, preferably selective visible, on or at the cooktop-panel. Therefore information can be visualized in a clearly laid out manner avoiding overload of information. Further, the cooktop-interface can be implemented without the need for extensive constructional efforts.

A cooktop-panel shall be understood to represent a panel or plate of a cooking device intended for placing cookware thereon for the purpose of applying heat to the cookware. The cooktop-panel may comprise a panel or plate made from glass, ceramic or something similar.

The back illumination lighting may be adapted to illuminate the display sign layer as a whole or at least one or several sections thereof respectively comprising one or several display signs. The size of the back illumination lighting may be adapted to or equal the size of the display design layer. However, it is also possible that the back illumination lighting is provided in or restricted to certain regions of the display sign layer, which regions are required to be illuminated. It is also conceivable that the back illumination lighting comprises several separate illumination segments.

If one or several of the display signs need not to be visualized, for example in an off state of the cooking-panel or part thereof, the back illumination lighting may be at least partially switched of so that only information relevant to the actual operational state is presented. This has the advantage that the information visualized to a user is clearly laid out while avoiding overload of information. Further, the outer appearance of the cooktop-panel at least in sections having respective cooktop-interfaces is not affected by signs that actually are not required. This may be of relevance for design issues of the cooktop-panel.

As already mentioned, it is possible to visualize only information that is relevant for an operator. For example, a cooktop-area temperature may be visualized or displayed as long as the temperature of a cooktop hob region can cause burns or inflammations of flammable objects placed thereon. If there is no need to display or visualize information, the display device and/or back illumination lighting can be deactivated or switched of completely. This may for example be accomplished automatically if respective parameters fall below preset threshold values. In this case the cooktop-interface may automatically switch to a standby mode. In the standby mode it is possible to keep specific information on how and where to reactivate the cooktop-interface, if required. Such information on how and where to reactivate the cooktop-interface may comprise a display sign indicating a respective power button. Such a power button may be provided in concert with the respective display sign, and may be of touch sensitive type. If the cooktop-panel or cooking device is not in use or in an off state, the cooktop-interface may be completely inactivated leaving no display or display sign visible from the upper side of the cooktop-panel. In this case a uniform cooktop-panel appearance can be obtained without any display signs and the like perturbing the non-operational design of the cooktop-panel or cooking device.

In an embodiment, the cooktop-interface may comprise at least one switching element, which may be of touch sensitive type for example. The switching element is provided with or at the cooktop-panel, and at least one switching element sign relating to at least one of switching operation, switching status and position of the switching element is provided. A switching element is meant to be a control unit adapted to change a parameter, in particular an operational parameter of the cooktop-interface, the cooktop-panel or cooking device. Such switching elements may be of touch sensitive, push button type or other.

The switching sign can be provided with the display sign layer or with a separate sign layer, preferably coplanar with and in the plane of the display sign layer, and may be illuminated by the back illumination lighting or a separate back illumination or other. Information relating to the switching element can be visualized according to respective needs, in particular in a clearly laid out manner. If no such information is required the back illumination lighting can be deactivated at least in a section in which the switching sign is located.

In a further embodiment the cooktop-interface comprises at least one further sign for providing additional information. Such information may for example relate to the operational state of the cooktop-panel or cooking device or depict a trademark, brand name or other label relating to the cooktop-interface, cooktop-panel or cooking device. Note that the cooktop-panel may comprise a glass, ceramic, in particular a glass ceramic panel.

In a preferred embodiment, the back illumination lighting comprises at least one illumination foil, in particular a phosphoric illumination foil, at least one thin film transistor (TFT) back lighting and/or at least one light guide. The foil or TFT back lighting may be applied to a lower side of at least the display sign layer with a light emitting surface facing the display sign layer. In this way the at least one display sign, switching element sign and further sign, if applicable, can be projected to the transparent or translucent cooktop-panel and thereby be visualized to an operator viewing the cooktop-panel from an upper side. Similarly, any light source may used in connection with a light guide which is arranged on the lower side of the display sign layer etc. and which is designed for directing light coupled into the light guide towards the display sign layer etc. thereby illuminating the at least one display sign layer etc. from the lower side thereof, i.e. from a side averted from the cooktop-panel.

Here it shall be mentioned that the different ways of back illumination may be arbitrarily combined, for example but not restricted to using different back illumination concepts for different segments of the cooktop-interface. Using one or more of the back illumination possibilities mentioned beforehand makes it in particular possible to specifically visualize respective information in a clearly laid out manner. The mentioned alternatives may be mixed to provide different modes of visualization, as for example in different colors, intensity and brightness.

In a further preferred embodiment the display sign layer comprises a mask, preferably a printed foil mask, in particular a black printed foil mask, where at least one of the at least one display sign, switching element sign and further sign, respectively, is defined by a transparent or translucent section. Such a mask can be easily applied to a great variety of cooktop-panels or substrates, in particular to state of the art cooktop-panels, not imposing extensive additional costs. The at least one display sign, at least one switching element sign and at least one further sign can be implemented with such masks in the form of negatively formed elements, i.e. elements left blank in the respective mask allowing light emanating from the back illumination lighting to pass through basically undisturbed.

The mask can be applied to a lower face of the cooktop-panel, in particular directly to cooktop-panel or on a separate substrate. In this case, the back illumination lighting can be arranged or applied at a mask side averted from the cooktop-panel or substrate. If required, one or several interlayers or separating layers can be provided between the cooktop-panel and the mask or substrate and between the mask and the back illumination lighting, respectively. Display device electronics of the display device can be arranged or attached at a side of the back illumination lighting averted from the mask, or more generally of the display sign layer. However, respective electronics can be integrated or printed on the display sign layer, in particular mask, in regions free from display signs, switching element signs and further signs. With this embodiment, the cooktop-interface can be implemented in a compact design, in particular readily applicable to conventional cooktop-panels, without the need for considerable constructional amendments. In particular, the cooktop-interface is fit for being used together with additional components such as cooking utensil sensors, preferably of capacitive type, and the like usually provided with cooktop-panels.

The back illumination lighting may be of single color, multiple color or color change design. In more detail, the back illumination lighting may comprise at least one of uniform, colored and color change lighting elements that may be selectively activated. In the alternative or in addition, transparent or trans-lucent sections of at least the display sign layer may comprise at least one of colored and color change elements imposing color changes to light passing through from the back illumination lighting. In the latter case, the back illumination lighting can be a single color light source and different colors or color changes can be accomplished by the colored and color change elements, respectively. Such a one to multiple color implementation allows to display information accurately and attentively.

In a preferred embodiment at least the display sign layer, in particular the mask, and the back illumination lighting, respectively, at least one of having cutouts and being transparent in areas in which display sites of the at least one display device face the cooktop-panel. Such an embodiment may lead to enhanced perceptibility of the information provided by the display device.

In a comprehensive embodiment the cooktop-interface may comprise at least one sensor element, in particular at least one capacitive sensor element, for sensing cooking utensils placed on the cooktop-panel. In particular, the cooktop-interface and any of the above-identified embodiments is compatible with such sensing elements without significant mutual interference.

According to claim 11, a cooktop-panel is provided, which cooktop-panel comprises at least one cooktop-interface in particular a cooktop-interface according to any of the above-identified embodiments. Advantages of the cooktop-panel can be readily extracted from the advantages of the cooktop-interface and respective embodiments as set out above.

According to claim 12, a cooking device is provided, which cooking device comprises a cooktop-panel previously mentioned.

According to claim 13, a method of operating a cooktop-interface of a cooktop-panel is provided. The method comprises the steps of projecting at least one of a display sign, switching element sign and further sign to a lower side of a cooktop-panel by illuminating a display sign layer, particularly a mask, with a back light illumination lighting; and displaying information via at least one display device, a display site thereof facing the cooktop panel through transparent sections of the display sign layer and/or back light illumination.

With the proposed method it is possible to visualize information on or at the cooktop-panel in a clearly laid out manner to an operator of a cooking device comprising such a cooktop-interface. In particular, it can be ensured that only essential information is visualized without confusing a user with signs providing information actually not relevant. The method can be implemented by operating the above described cooktop-interface or any of its embodiments according to the possibilities set out in further detail above. In particular, if no information has to be presented, the display device and back illumination lighting can be deactivated thus leaving no signs or information left visible on the cooktop-interface. This in particular opens the possibility to provide a unique design at least in a non-operational state of the cooktop-interface or even the cooking device. In particular it is possible that the cooktop-interface is basically fully inactivated if the cooktop-interface or a cooktop hub region is switched off or switched to a standby mode, and that the cooktop-interface is, at least partially, activated in the event that the cooktop-interface, at least one cooktop hub region or cooking device at least is partially switched on.

Figure 2:
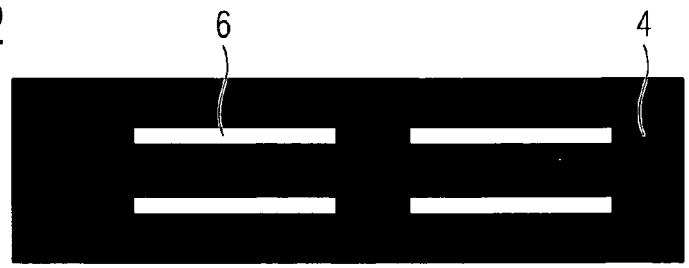
Figure 3:
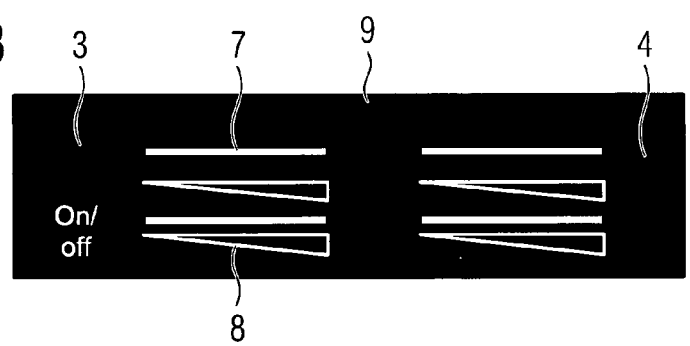
Figure 4:
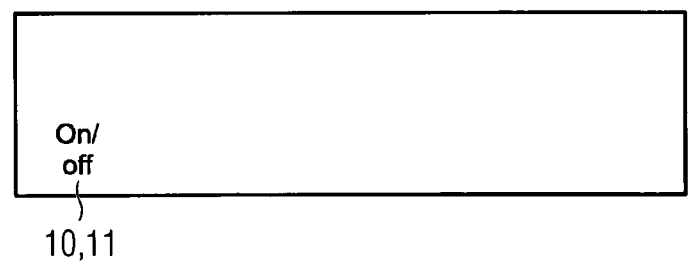
Figure 5:
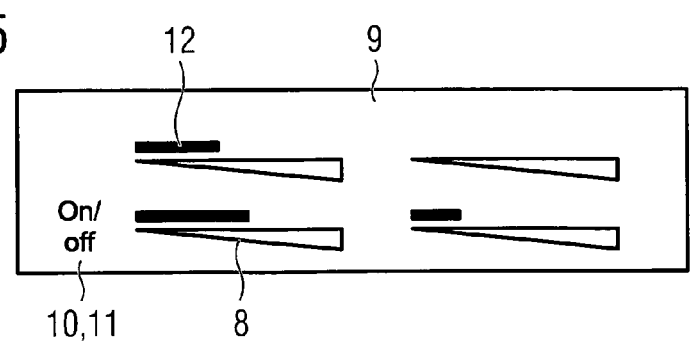

Embodiments of the invention will now be described in connection with the annexed figures, in which FIG. 1 shows an exploded view of a cooktop-panel together with a cooktop-interface;

FIG. 2 shows an implementation of a respective back light illumination lighting of the cooktop-interface FIG. 3 shows an implementation of a respective display sign layer of the cooktop-interface FIG. 4 shows information visualized with a cooktop-interface in a first operational state; and FIG. 5 shows information visualized with a cooktop-interface in a second operational state.

If not otherwise stated like elements are denoted by like reference signs throughout the figures. The figures may not be true to scale, and scales of different figures may be different.

FIG. 1 shows an exploded view of a cooktop-panel 1 together with a cooktop-interface 2. The cooktop-interface 2 comprises a display sign layer 3, a back illumination lighting 4 and a display device 5.

The cooktop-panel 1 shown makes up at least a section of a cooking hob, comprising one or several cooking hob regions or stove tops, in particular of glass, ceramic or glass-ceramic type.

The display sign layer 3 is applied to a lower side of the cooktop-panel 1. If required, one or more interlayers or intermediate layers may be provided between the cooktop-panel 1 and the display sign layer 3. The display sign layer 3 in the present case is a black printed foil mask. However, other implementations may be contemplated.

On a lower side of the display sign layer 3 the back illumination lighting 4 is provided. If required one or several additional interlayers or intermediate layers can be provided between the display sign layer 3 and the back illumination lighting 4. The interlayers or intermediate layers may be adapted to provide optimal optical coupling between the back illumination lighting 4, the display sign layer 3 and the cooktop-panel 1.

The back illumination lighting 4 in the present case comprises an illumination foil, such for example a phosphoric illumination foil or TFT illumination.

On a lower side of the back illumination lighting 4 the display device 5 is arranged, again if required by interposing interlayers or intermediate layers for adequately separating the back illumination lighting 4 from the display device. Note that such a separating effect may apply to the interlayers or intermediate layers mentioned further above.

As can be seen, the cooktop-interface 2 is of compact design, in particular applicable to most conventional cooktop-panels. Further, as the display sign layer 3 and back illumination lighting 4 are comparatively flat in construction, the display device 5 may without difficulty arranged below the other components despite limited space conditions usually prevailing in a space below the cooktop-panel 1.

FIG. 2 shows an implementation of a respective back light illumination lighting 4 of the cooktop-interface 2. As can be seen, the back illumination lighting 4 has four first cutouts 6. The four first cutouts 6 are located in areas in which display sites of the display device 5 face the back light illumination lighting 4. The first cutouts 6 define transparent sections through which information provided by the display sites of the display device 5 shall be visibly provided to an operator observing the upper side of the cooktop-panel 1.

FIG. 3 shows an implementation of a respective display sign layer 3 of the cooktop-interface 2. The display sign layer 3 comprises second cutouts 7 basically flush with the first cutouts 6 in the assembled state of the cooktop-interface. Similar to the first cutouts 6, the second cutouts 7 define transparent sections through which information provided by the display sites of the display device 5 shall be visibly provided to an operator observing the cooktop-panel 1.

Further, the present display sign layer 3 comprises in total four display signs 8 each represented by a tapered polygon. The display signs 8 of the display sign layer 3 are implemented as transparent or translucent sections at least for light emitted by the back illumination lighting. Each of the display signs 8 is assigned to a respective cooking hob region (not shown) of the cooking-panel 1. A cooking hob region is meant to be a circular or oval shaped region intended to place cookware to be heated thereon.

The display sign layer 3 further comprises a further sign 9 which in the present case is a brand name of the cooking-panel 1 or related cooking device.

The operation of the cooktop-interface 2 is explained in more detail in connection with FIG. 4 and FIG. 5

FIG. 4 shows information visualized with the cooktop-interface 2 in a first operational state. In the first operational state, the cooktop-interface 2 is switched off or in a standby mode. No information relating to the display device 5, the display signs 8 or further sign 9 is visible when viewing the top side of the cooktop-panel 1. The only information visible with the present implementation is represented by an additional further sign, which by the way is provided with the display sign layer 3.

The additional further sign is presently indicated by "On/Off" which shall mean that at least the operational state of the cooktop-interface 2 is visualized or projected to the cooktop-panel 1 by back illumination lighting 4. This can be obtained by selectively powering a respective section of the back illumination lighting 4 or by providing an extra back illumination lighting element. The additional further sign presently is represented by a switching element sign 10 indicating a current status and a position of a switching element 11 provided with the cooktop-panel 1 and adapted to activate or inactivate the cooktop-interface 2 or cooktop-panel 1.

The switching element 11 may be of touch sensitive type. Further, the switching element 11 may be designed such that it is not visible from the upper side of the cooktop-panel 1 if the switching element sign 10 is not illuminated by the back illumination lighting 4 (situation not shown). Hence, if required, a completely unimpressive and uniform appearance of the cooktop-panel 1 in a region comprising the cooktop-interface 2 can be obtained, which may be desirable for design reasons.

FIG. 5 shows information visualized with the cooktop-interface 2 in a second operational state. The second operational state represents a situation in which the cooktop-interface 2 is activated, visualizing display site information 12 of the display device 5, the display signs 8, further display sign 9 and the switching element sign 10. The display site information 12 is represented by horizontal bars presently indicating the actual temperature of respective cooking hob regions assigned to respective display sites 12. With the present illustration only three cooking hob regions are active while one of them is inactive or has a temperature below a preset threshold.

The bars are visible from the top of the cooking-panel 1 via the transparent first cutouts 6 and second cutouts 7 provided with the back illumination lighting 4 and display sign layer 3, respectively.

The display signs 8, the further sign 9 and the switching element sign 10 are visible from the top of the cooking-panel 1 in that the back illumination lighting 4 projects the respective signs to the cooktop-panel 1.

If required, the back illumination lighting 4 can be adapted to selectively irradiate at least one of the display signs 8, the further sign 9 and switching element sign 12, preferably in a respective preset color. Colored illumination may inter alia be useful in emphasizing the relevance of information presented to the operator. For example, display sites of inactivated cooking hob regions may be irradiated in white while display sites of activated or hot cooking hob regions may be irradiated in red. Other color modes are readily conceivable. For example, different colors may be selected for the switching element sign 10 and further sign 9, in particular according to respective design concepts.

As already mentioned, the display signs 8 shown in FIG. 3 and FIG. 5 show up as tapered polygons indicating the direction of raising and decreasing temperature or minimal and maximal values respectively. Therefore, the bars, i.e. the display site information 12, visualized in the display sites of the display device 5 is representative of the temperature of respective cooking hob regions relative to a minimal and maximal power regime.

As can be seen, the cooktop-interface 2 allows visualization of clearly laid out information to an operator of the cooktop-panel 1 or cooking device without the danger of information overload. The cooktop-interface 2 may be adapted such that an operator can freely select the amount of information visualized. At least one touch sensitive element assigned or selectively assignable to at least one display site, display sign 8, further sign 9 and switching element sign 10 may be provided. The touch sensitive element may be adapted to change or alter operational parameters or other values assigned to the information provided by the display site, display sign 8, further sign 9 and switching element sign 10

As can be seen, the cooktop-interface 2 can be implemented with state of the art cooktop-panels. In particular, the proposed cooktop-interface is of compact and flat design leaving enough space for and basically not restricting the implementation of further components, such as sensor devices or sensor elements for sensing cooking utensils placed on the cooktop-panel 1. Such sensor devices may comprise capacitive sensor elements for sensing metal cookware placed on cooking hob regions of the cooktop-panel 1.

LIST OF REFERENCE NUMERALS 1 cooktop-panel
2 cooktop-interface
3 display sign layer
4 back illumination lighting
5 display device
6 first cutout
7 second cutout
8 display sign
9 further sign
10 switching element sign
11 switching element
12 display site information

The invention claimed is:

1. A cooktop-interface (2) comprising:
at least one display device (5),
a display sign layer (3) comprising at least one display sign (8) provided in connection with the display device (5), and
at least one back illumination lighting (4) for projecting the at least one display sign (8) on a cooktop-panel (1) arranged upstream the back illumination lighting (4) and the display sign layer (3),
wherein the back illumination lighting (4) comprises at least one illumination foil arranged on a lower side of the display sign layer (3), and
wherein the display device (5) is arranged on a lower side of the back illumination lighting (4).

2. The cooktop-interface (2) according to claim 1, further comprising at least one switching element (11) provided with or at the cooktop-panel (1) and at least one switching element sign (10) displaying at least one of switching operation, switching status and position of the switching element (11).

3. The cooktop-interface (2) according to claim 1, further comprising at least one further sign (9) for providing additional information.

4. The cooktop-interface (2) according to claim 1, wherein the cooktop-panel (1) is a glass, ceramic, or glass-ceramic panel.

5. The cooktop-interface (2) according to claim 1, wherein the back illumination lighting (4) further comprises at least one thin film transistor back lighting and/or at least one light guide.

6. The cooktop-interface (2) according to claim 5, wherein the at least one illumination foil is a phosphoric illumination foil.

7. The cooktop-interface (2) according to claim 1, wherein the display sign layer (3) comprises a mask; and wherein the at least one display sign (8), a switching element sign (10), and a further sign (9) are defined by transparent sections (7) of the display sign layer (3).

8. The cooktop-interface (2) according to claim 7, wherein the display sign layer (3) comprises a black printed foil mask.

9. The cooktop-interface (2) according to claim 7, wherein at least one of the mask and the back illumination lighting (4) comprises cutouts (6, 7) and is transparent in areas (6, 7) in which display sites (12) of the at least one display device (5) face the cooktop-panel (1).

10. The cooktop-interface (2) according to claim 1, wherein the display sign layer (3) is applied to a lower face of the cooktop-panel (1), the back illumination lighting (4) is arranged at a side of the display device layer (3) averted from the cooktop-panel (1), and display device electronics of the display device (5) are arranged at a side of the back illumination lighting (4) averted from the display sign layer (3) and facing the cooktop-panel (1).

11. The cooktop-interface (2) according to claim 1, wherein the back illumination lighting (4) comprises at least one of colored and color change lighting elements, and/or transparent sections (7) of the at least the display sign layer (3) comprise at least one of colored and color change elements.

12. The cooktop-interface (2) according to claim 1, wherein at least one of the display sign layer (3) and the back illumination lighting (4) comprises cutouts (6, 7) and is transparent in areas (6, 7) in which display sites (12) of the at least one display device (5) face the cooktop-panel (1).

13. The cooktop-interface (2) according to claim 1, further comprising at least one sensor element for sensing cooking utensils placed on the cooktop-panel (1).

14. The cooktop-interface (2) according to claim 13, wherein the at least one sensor element is a capacitive sensor element.

15. A cooktop-panel (1) comprising at least one cooktop-interface (2) according to claim 1.

16. A cooking device comprising a cooktop-panel (1) according to claim 15.

17. The cooktop-interface (2) according to claim 1, wherein the at least one back illumination lighting (4) is arranged between the display sign layer (3) and the display device (5).

18. The cooktop-interface (2) according to claim 1, wherein the back illumination lighting (4) comprises at least one illumination foil arranged between the display sign layer (3) and a surface of the back illumination lighting (4) facing the display sign layer (3).

19. A method of operating a cooktop-interface (2), comprising the steps of:
  projecting at least one display sign (8), a switching element sign (10), and a further sign (9) to a lower side of a cooktop-panel (1) by illuminating a display sign layer (3) with a back illumination lighting (4), and
  displaying information via at least one display device (5), wherein a display site (12) of the at least one display device (5) faces the cooktop-panel (1) through transparent sections (6, 7) of the display sign layer (3) and/or the back illumination lighting (4),
  wherein the back illumination lighting (4) comprises at least one illumination foil arranged on a lower side of the display sign layer (3), and
  wherein the at least one display device (5) is arranged on a lower side of the back illumination lighting (4).

20. The method according to claim 19, wherein the cooktop-interface (2) is fully inactivated when cooktop hub regions of the cooktop-panel (1) are switched off, and wherein the cooktop-interface (2) is at least partially activated when at least one cooktop hub region of the cooktop-panel (1) is switched on.

21. A method of operating a cooktop-interface (2) according to claim 19, wherein the display sign layer (3) is a mask.

* * * * *